US008019068B2

(12) United States Patent
Kogiantis et al.

(10) Patent No.: US 8,019,068 B2
(45) Date of Patent: Sep. 13, 2011

(54) METHOD OF ALLOCATING POWER FOR THE SIMULTANEOUS DOWNLINK CONVEYANCE OF INFORMATION BETWEEN MULTIPLE ANTENNAS AND MULTIPLE DESTINATIONS

(75) Inventors: Achilles George Kogiantis, Madison, NJ (US); Lawrence Howard Ozarow, Morris Township, Morris County, NJ (US)

(73) Assignee: Alcatel Lucent, Paris (FR)

( * ) Notice: Subject to any disclaimer, the term of this patent is extended or adjusted under 35 U.S.C. 154(b) by 1025 days.

(21) Appl. No.: 09/950,741

(22) Filed: Sep. 12, 2001

(65) Prior Publication Data

US 2003/0050069 A1    Mar. 13, 2003

Related U.S. Application Data

(63) Continuation-in-part of application No. 09/727,896, filed on Dec. 1, 2000, now Pat. No. 6,751,480.

(51) Int. Cl.
*H04M 3/42* (2006.01)
*H04B 1/04* (2006.01)
*H04B 7/00* (2006.01)
*H04W 72/00* (2009.01)

(52) U.S. Cl. .............. 379/201.05; 455/452.1; 455/509; 455/103

(58) Field of Classification Search .......... 455/403, 455/422.1, 423–425, 436, 440–444, 450–454, 455/500–502, 506, 509–513, 515, 524–526, 455/63.1, 63.2, 63.4, 103, 114.2, 67.11, 67.13, 455/67.14, 226.1–226.3, 343.3, 412.1, 452.1
See application file for complete search history.

(56) References Cited

U.S. PATENT DOCUMENTS

| | | | | |
|---|---|---|---|---|
| 5,267,297 | A * | 11/1993 | Kawano et al. | 455/561 |
| 5,842,114 | A * | 11/1998 | Ozluturk | 455/69 |
| 5,923,650 | A * | 7/1999 | Chen et al. | 370/331 |
| 5,926,768 | A * | 7/1999 | Lewiner et al. | 455/562.1 |
| 6,009,124 | A * | 12/1999 | Smith et al. | 375/267 |
| 6,122,291 | A * | 9/2000 | Robinson et al. | 370/468 |
| 6,229,795 | B1 * | 5/2001 | Pankaj et al. | 370/329 |
| 6,317,435 | B1 * | 11/2001 | Tiedemann et al. | 370/441 |

(Continued)

FOREIGN PATENT DOCUMENTS

EP    1 130 872    9/2001

OTHER PUBLICATIONS

Yuming Lu, et al, "Unified Power Control, Error Correction Coding and Scheduling for a CDMA Downlink System", *Wireless Networks*, ACM, US, vol. 3 No. 1, (Mar. 1, 1997), pp. 83-90.

(Continued)

*Primary Examiner* — Joseph T Phan
(74) *Attorney, Agent, or Firm* — John Ligon

(57) ABSTRACT

A method of scheduling a plurality of subscriber equipment based on sets of channel conditions and calculated power allocations for downlink channels of an air interface of a wireless communication system to satisfy a desired system requirement. A set of subscriber requesting access to the communication system or being provided access to the communication are selected by a scheduler based on their channel conditions and power allocation calculation. The scheduler then schedules the selected set of subscribers to achieve the desired system requirement whereby the subscribers simultaneously receive information from a multiple of antennas which are typically located at a base station.

7 Claims, 3 Drawing Sheets

U.S. PATENT DOCUMENTS

| | | | | |
|---|---|---|---|---|
| 6,321,082 | B1* | 11/2001 | Katz | 455/422.1 |
| 6,377,809 | B1* | 4/2002 | Rezaiifar et al. | 455/455 |
| 6,434,367 | B1* | 8/2002 | Kumar et al. | 455/70 |
| 6,463,301 | B1* | 10/2002 | Bevan et al. | 455/562.1 |
| 6,662,024 | B2* | 12/2003 | Walton et al. | 455/562.1 |
| 6,694,147 | B1* | 2/2004 | Viswanath et al. | 455/517 |
| 6,741,862 | B2* | 5/2004 | Chung et al. | 455/452.1 |
| 6,751,480 | B2* | 6/2004 | Kogiantis et al. | 455/562.1 |
| 6,778,507 | B1* | 8/2004 | Jalali | 370/317 |
| 6,836,666 | B2* | 12/2004 | Gopalakrishnan et al. | 455/452.2 |
| 7,027,418 | B2* | 4/2006 | Gan et al. | 370/329 |
| 7,046,965 | B2* | 5/2006 | Maeda et al. | 455/67.13 |
| 7,065,376 | B2* | 6/2006 | Wolman et al. | 455/517 |
| 7,222,166 | B2* | 5/2007 | Treister et al. | 709/223 |
| 7,249,156 | B2* | 7/2007 | Chae | 709/203 |
| 7,263,335 | B2* | 8/2007 | Leabman | 455/73 |
| 7,283,834 | B2* | 10/2007 | Wolman et al. | 455/517 |
| 7,310,661 | B2* | 12/2007 | Treister et al. | 709/208 |
| 7,336,694 | B2* | 2/2008 | Ghosh | 375/130 |
| 7,411,895 | B2* | 8/2008 | Laroia et al. | 370/203 |
| 7,447,154 | B2* | 11/2008 | Harris et al. | 370/232 |
| 7,460,839 | B2* | 12/2008 | Leabman | 455/101 |
| 7,463,616 | B1* | 12/2008 | Earnshaw et al. | 370/347 |
| 7,477,624 | B2* | 1/2009 | Gan et al. | 370/329 |
| 7,558,602 | B2* | 7/2009 | Kogiantis et al. | 455/561 |
| 7,570,614 | B2* | 8/2009 | Treister et al. | 370/329 |
| 7,586,862 | B2* | 9/2009 | Leabman | 370/310 |
| 7,599,702 | B2* | 10/2009 | Molnar et al. | 455/517 |
| 7,609,614 | B2* | 10/2009 | Fonseka et al. | 370/208 |
| 7,630,339 | B2* | 12/2009 | Laroia et al. | 370/330 |
| 7,650,152 | B2* | 1/2010 | Li et al. | 455/452.1 |
| 7,680,470 | B2* | 3/2010 | Leabman | 455/130 |
| 7,715,358 | B2* | 5/2010 | Li et al. | 370/344 |
| 7,724,722 | B2* | 5/2010 | Seo et al. | 370/344 |
| 7,877,100 | B2* | 1/2011 | Rick et al. | 455/456.1 |
| 7,903,608 | B2* | 3/2011 | Gan et al. | 370/329 |
| 7,933,244 | B2* | 4/2011 | Li et al. | 370/329 |
| 2002/0123365 | A1* | 9/2002 | Thorson et al. | 455/524 |
| 2002/0151310 | A1* | 10/2002 | Chung et al. | 455/452 |
| 2002/0183064 | A1* | 12/2002 | Gopalakrishnan et al. | 455/452 |
| 2003/0002461 | A1* | 1/2003 | Chaponniere et al. | 370/335 |
| 2003/0002464 | A1* | 1/2003 | Rezaiifar et al. | 370/336 |
| 2003/0003921 | A1* | 1/2003 | Laakso | 455/453 |
| 2003/0013451 | A1* | 1/2003 | Walton | 455/447 |
| 2003/0050084 | A1* | 3/2003 | Damnjanovic et al. | 455/522 |
| 2004/0142714 | A1* | 7/2004 | Viswanath et al. | 455/517 |
| 2004/0224712 | A1* | 11/2004 | Tiedemann et al. | 455/518 |
| 2004/0233867 | A1* | 11/2004 | Wheatley et al. | 370/328 |

OTHER PUBLICATIONS

Ozgur Gurbuz, et al, "Dynamic Resource Scheduling Schemes for W-CDMA Systems", *IEEE Communications Magazine*, vol. 38, No. 10, (Oct. 2000), pp. 80-84.

Ramin Rezaiifar, et al, "Proof of Convergence for the Distributed Optimal Rate Assignment Algorithm", *Vehicular Technolgy Conference, 1999 IEEE 49th Houston*, TX, (May 16-20, 1999), pp. 1841-1845.

European Search Report EP 02 25 2095.

\* cited by examiner

METHOD OF ALLOCATING POWER FOR THE SIMULTANEOUS DOWNLINK CONVEYANCE OF INFORMATION BETWEEN MULTIPLE ANTENNAS AND MULTIPLE DESTINATIONS

RELATED APPLICATIONS

This application is a continuation in part of U.S. patent application Ser. No. 09/727,896, filed Dec. 1, 2000, and issued Jun. 15, 2004 as U.S. Pat. No. 6,751,480.

Related subject matter is disclosed in the following applications concurrently filed herewith: U.S. Patent Applications entitled "Method For The Simultaneous Uplink and Downlink Conveyance Of Information Between Multiple Mobiles And a Base Station Equipped With Multiple Antennas", Ser. No. 09/950,912 and "Method For Multi-Antenna Scheduling Of HDR Wireless Communication Systems", Ser. No. 09/950,913.

BACKGROUND OF THE INVENTION

1. Field of the Invention

The present invention relates to communication systems and more particularly to wireless communication systems.

2. Description of the Related Art

Communication systems and in particular, wireless communication system are designed to meet the varying demands of their subscribers. Service providers, which are entities that own, operate and properly maintain the communication system, are constantly seeking ways to improve the overall performance of a communication system without incurring substantial cost increases in the operation of such communication systems. In particular, as wireless communication systems become more and more popular, service providers have to provide communication systems that allow subscribers to convey (i.e., transmit and/or receive) relatively larger amounts of information per unit time. The amount of information conveyed per unit time is the information rate. The total amount of information that can be conveyed over a system is usually referred to as a system's capacity. The amount of information that is successfully conveyed (i.e., information transmitted and received without errors) over a communication system is usually referred to as system throughput. Subscribers of a communication system with a certain system capacity are limited in the amount of information they can convey at any instant of time. Depending on the conditions of the communication channels through which the subscribers convey information, the subscriber throughput and/or capacity will not remain fixed. Therefore, there may be times when a subscriber desires to convey information at a certain information rate with a certain throughput, but will not be able to do so because of adverse channel conditions. In particular, the communication system may not be able to accommodate a subscriber desiring relatively higher information rates.

To address the problem of a subscriber's inability to convey information at a desired information rate, subscribers use equipment (e.g., cell phones or mobiles) that have multiple antennas instead of only one antenna. The use of additional antennas in a subscriber's equipment gives the subscriber the ability to convey information at relatively higher rates. However, the increased capacity of the subscriber's equipment through the use of additional antennas will still be limited by the system's capacity at any instant of time. For example, a subscriber equipment having multiple antennas may have the capability and desire to convey information at a certain rate, but will be limited to a lesser rate by the system at a particular instant of time. In sum, it is the system's capacity—not the capacity of a subscriber's equipment—which ultimately governs the rate at which a subscriber conveys information. Furthermore, the use of multiple antennas in subscriber equipment complicates the design of such equipment, complicates how the subscriber equipment communicates with the communication system and increases the cost of the subscriber equipment.

System capacity and system throughput are two examples of system requirements that service providers want to manipulate so as to operate their communication systems in an efficient manner. Other examples of system requirements are the power allocation to the communication system and system delay experienced by the subscribers of the communication system. The power allocation refers to the amount of power available and the proportional amount of power allocated to each communication channel being used by one or more subscribers. System delay refers to the amount of latency experienced by subscriber signals as a result of such signals being processed by system equipment owned, operated and maintained by the service provider. System providers want to provide relatively large system capacity and throughput to their subscribers with the amount of total power available to the system while reducing system delay as much as possible. Many times these system requirements conflict with each other and make it difficult to achieve efficient operation of the communication system. Service providers often resort to buying additional equipment to satisfy one or more of the system requirements. What is therefore needed is a method and system where one or more system requirements can be achieved without the service provider incurring the cost of additional equipment.

SUMMARY OF THE INVENTION

The present invention provides a method that allows a service provider to satisfy one or more system requirements by allocating the proper amount of power to communication channels being used by subscribers of a wireless communication system. The system equipment (e.g., base station) receives signaling information responding to downlink transmissions by such system equipment. The system equipment is provided with multiple antennas for transmitting and receiving simultaneously traffic signals and signaling signals to and from a multiple of subscribers. The method of the present invention determines sets of downlink channel conditions from the received signaling information where each set of downlink channel conditions is associated with a subscriber requesting access to the communication system and/or a subscriber being provided access to the communication system. Proper power allocations associated with the sets of downlink channel conditions are calculated. The calculated power allocations and their associated sets of downlink channel conditions are then applied to a scheduler. The scheduler then selects a set of subscribers to be given access to the downlink channels that will satisfy one or more system requirements. In this manner, a service provider is able to satisfy or even surpass one or more system requirements without incurring the cost of procuring additional equipment.

It should be noted that the multiple antennas need not be co-located at a particular base station and the scheduler of the present invention can be part of the base station equipment or part of other system equipment operated, maintained and owned by the service provider of the communication system.

DETAILED DESCRIPTION

The present invention provides a method that allows a service provider to satisfy one or more system requirements by allocating the proper amount of power to communication channels being used by subscribers of a wireless communication system. The system equipment (e.g., base station) receives signaling information responding to downlink transmissions by such system equipment. The system equipment is provided with multiple antennas for transmitting and receiving simultaneously traffic signals and signaling signals to and from a multiple of subscribers. The method of the present invention determines sets of downlink channel conditions from the received signaling information where each set of downlink channel conditions is associated with a subscriber requesting access to the communication system or a subscriber being provided access to the communication system (incoming call to a subscriber, for example). Proper power allocations associated with the sets of downlink channel conditions are calculated. The calculated power allocations and their associated sets of downlink channel conditions are then applied to a scheduler. The scheduler then selects a set of subscribers to be given access to the downlink channels to satisfy one or more system requirements. In this manner, a service provider is able to satisfy or even surpass one or more system requirements without incurring the cost of procuring additional equipment.

It should be noted that the multiple antennas need not be co-located at a particular base station and the scheduler of the present invention can be part of the base station equipment or part of other system equipment operated, maintained and owned by the service provider of the communication system. The terms 'subscriber' and 'subscriber equipment' will hereinafter be used interchangeably to denote a subscriber of the communication system using typical subscriber equipment to convey information over the system. Access to the communication system is a subscriber being able to use the resources (e.g., communication channels, power allocation) of the communication system to convey information to other subscribers or to the system.

Figure 1:
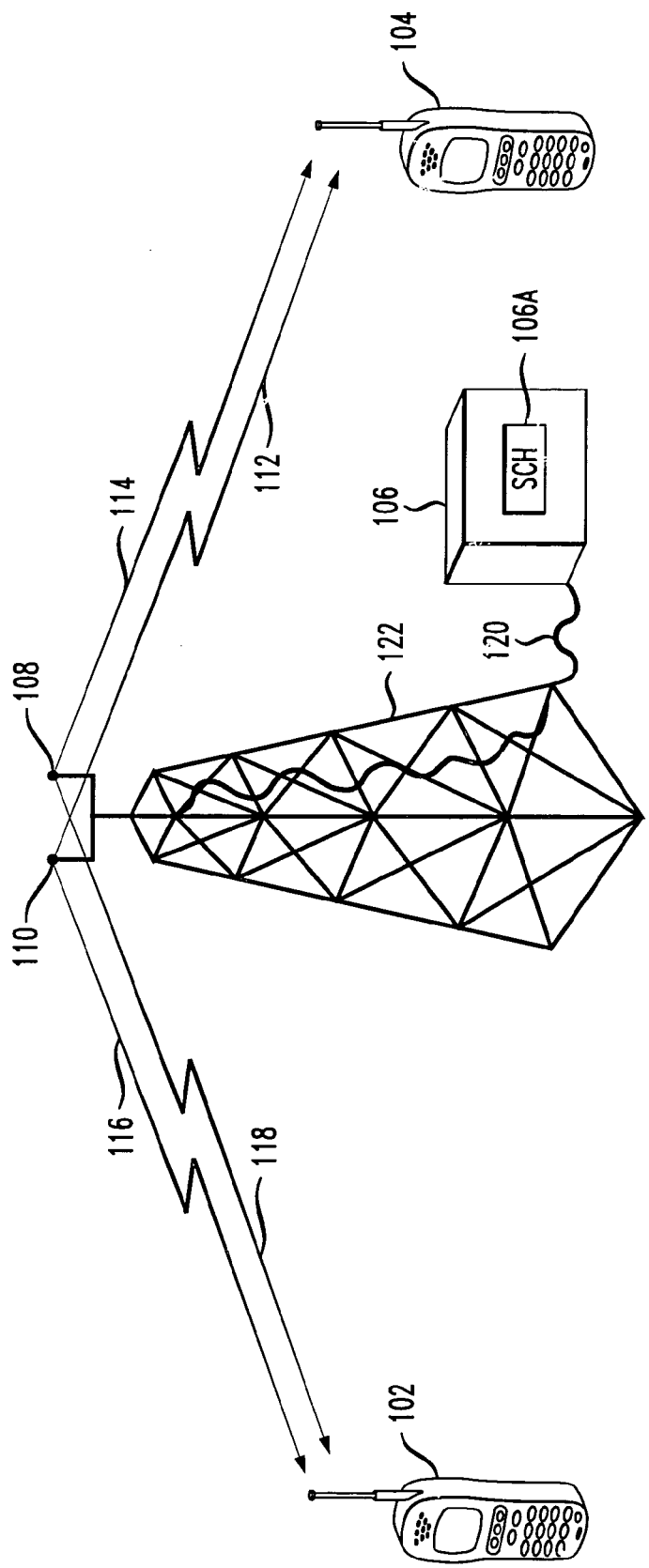
FIG. 1 shows a portion of a wireless communication system with a scheduler that is part of base station equipment and downlink channels that allow subscribers to communicate with the base station.

Referring now to FIG. 1, there is shown a portion of a wireless communication system comprising a base station and two subscriber equipment (102, 104) shown as cellular phones. It should be noted that the subscriber equipment is not limited to cellular phones but can be any type of communication equipment (e.g., laptop personal computer, Personal Digital Assistant (PDA)) typically used by subscribers of communication systems. The base station has base station equipment comprising tower 122 with two antennas 108 and 110 connected to electrical and electronic equipment 106 via cable 120. Cable 120 can be a coaxial cable, an electrical wire cable, an optical fiber cable or any combination thereof. It should be noted that the method of the present invention is applicable to system equipment having N antennas where N is an integer equal to 2 or greater. Also, the number of subscribers in simultaneous communication with the base station is not limited to two; the method of the present invention is applicable to a plurality of subscribers being scheduled to communicate with a plurality of antennas. However, for ease of explanation, the base station depicted in FIG. 1 and the description which follows refer to two antennas in communication with two subscribers.

Still referring to FIG. 1, electrical and electronic equipment 106 comprise typical radio equipment and signal processing equipment used to generate and process communication signals. Scheduler 106A forms part of equipment 106 and can be implemented as software, firmware, hardware or any combination thereof. Subscribers 102 and 104 communicate with the base station over an air interface. The air interface comprises communication channels through which traffic signals and signaling information are conveyed. The traffic signals are the signals being conveyed between different subscribers or between subscribers and base station equipment or other system equipment. System equipment are any equipment that are part of the communication system which are owned, operated and maintained by the service provider. The signaling information are information being conveyed between subscriber equipment and base station equipment. The signaling information is used to operate the communication system in accordance with a particular protocol from a standard being followed by the communication system.

The communication channels constituting the air interface are uplink channels and downlink channels. The uplink channels (not shown) are channels through which subscriber equipment transmit information to a base station or other system equipment. There are also uplink signaling channels used by the system subscriber equipment to transmit signaling information to the base station or other system equipment. The downlink traffic channels shown in FIG. 1 are channels 112, 114, 116 and 118 are communication channels through which the base station (or other system equipment) transmit information to the subscriber equipment. There are also downlink signaling channels (not shown) which are used by the base station or other system equipment to transmit signaling information to the subscriber equipment. FIG. 1 shows antenna 108 transmitting traffic simultaneously to subscribers 102 and 104 via downlink communication channels 118 and 114 respectively. Also antenna 110 is transmitting traffic signals simultaneously to subscriber equipment 102 and 104 via downlink communication channels 116 and 112 respectively.

Figure 2:
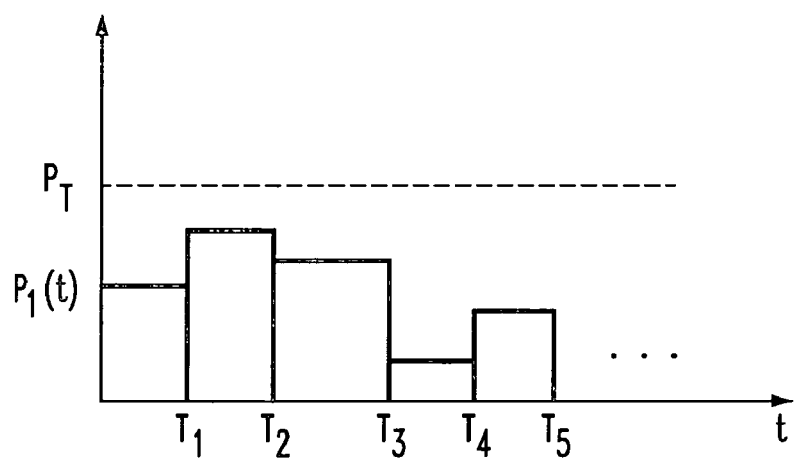
FIG. 2 shows a timing diagram of the power allocated to each of the two antennas shown in FIG. 1.
Figure 2:
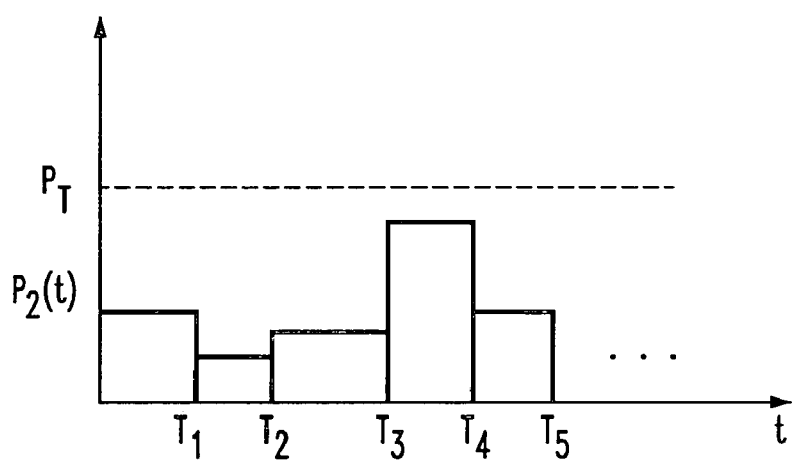

Referring now to FIG. 2, there is shown a power allocation timing diagram for the two subscriber equipment shown in FIG. 1. The total amount of power available for the antennas is $P_T$ and thus at any point in time $P_T = P_1(t) + P_2(t)$ where $P_1(t)$ is the power allocated to antenna 108 as a function of time and $P_2(t)$ is the power allocated to antenna 110 as a function of time. Power allocation to an antenna refers to the amount of power provided to radio equipment and processing equipment coupled to that particular antenna which equipment enable the transmission and reception of signals with that antenna. The particular amount of power allocated to each antenna lasts for a certain time period. The time period for each antenna need not coincide with the time period for any other antenna. However, for the sake of simplicity, the time periods shown in FIG. 2 are the same for each antenna.

Figure 3:
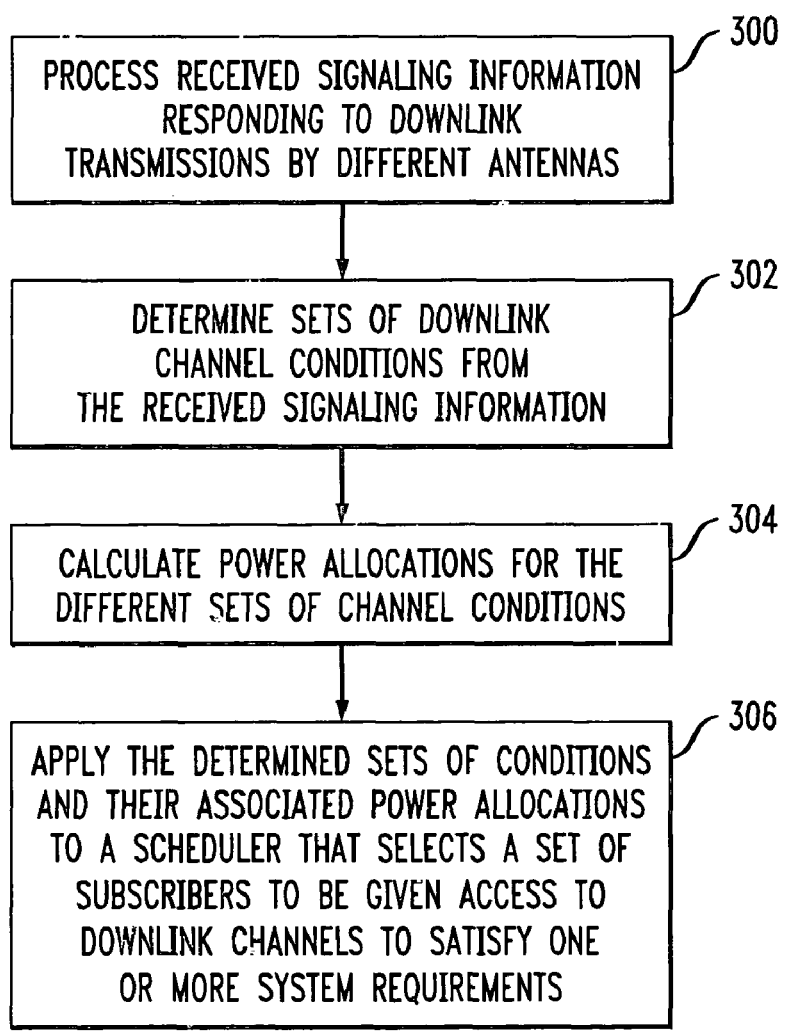
FIG. 3 shows a flowchart depicting the method of the present invention.

Referring now to FIG. 3, there is shown a flowchart of the steps of method of the present invention. In step 300, information received by the base station (such as the one in FIG. 1) is processed by the base station. The base station is provided with a multiple of antennas for simultaneously conveying information to one or a multiple of subscribers. The received information is signaling information transmitted over an uplink signaling channel (not shown) in response to downlink transmissions over communication channels 112, 114, 116 and 118. Antenna 108 transmits traffic signals and signaling information to subscriber equipment 104 over downlink channel 114. Antenna 108 also transmits traffic and signaling information to subscriber 102 over downlink channel 118. Antenna 110 transmits traffic signals and signaling information to subscriber equipment 104 over downlink channel 112 and to subscriber 102 over downlink channel 116.

Subscriber equipment 104 and 102 measure characteristics of the traffic and signaling signals from antennas 108 and 110. It is well known that subscriber equipment (e.g., cell phones) have the capability to measure characteristics of received traffic and signaling signals. Examples of the signal characteristics that are measured by subscriber equipment 104 include the following: amplitude level, power level, phase jitter, frequency translation, channel gain, information error rate (e.g., bit error rate or BER). Other well known signal characteristics of the signals received by subscriber equipment 104 that can be measured include signal propagation delay and therefore, the signal characteristics that can be measured are not limited to the list described above. The values of the various signal characteristics measured by subscriber equipment 104 are referred to as a set of downlink channel conditions for subscriber equipment 104.

Subscriber equipment 102, in the same manner as subscriber equipment 104, generates a similar set of downlink conditions from traffic and signaling signals it receives from antennas 108 and 110 over downlink channels 118 and 116 respectively. The set of downlink channel conditions from each subscriber are transmitted as part of signaling information over respective uplink signaling channels (not shown) for each subscriber. Antennas 108 and 110 receive the signaling information and transfer such information to base station equipment 106. Therefore, in step 300, base station equipment 106 process such information by retrieving the downlink channel conditions from the signaling information transmitted by the subscribers and associating the retrieved downlink channel conditions to particular subscribers. The association of a downlink channel condition to a particular subscriber involves recognizing that the retrieved downlink channel condition originated from that particular subscriber.

In step 302, sets of the retrieved downlink channel conditions are determined. In other words, channel conditions associated with a particular subscriber are grouped into a set of channel conditions. A set is determined for each of the subscribers requesting access to the communication system or being provided access to the communication system. Examples of channel conditions transmitted by the subscribers include the power amplitude of signals received by the subscribers, relative phase of signals received over the downlink by subscribers, information rate of the signals received over the downlink by the subscribers and user identification information that specify the user for whom the signals are intended. Some or all of the downlink conditions are typically obtained by the subscriber equipment measuring signal characteristics of pilot signals transmitted by the base station to subscriber equipment. The pilot signals are signals that serve as sort of a beacon to signal subscribers in the vicinity of the base station. Pilot signals are typically broadcast in a continuous and/or periodic manner by the base station equipment. Each of the multiple antennas would transmit pilot signals and as discussed above the relative phase of the signals can be measured by subscriber equipment to be included in the set of channel conditions for that subscriber. Also, the power level of the pilot signals is another measurement that can be made by the subscriber equipment. Pilot signals carry such other information as information rate of information to be transmitted over the downlink channel and the identification number or numbers of the subscriber equipment for whom the pilot signal is intended. The pilot signals may or may not be transmitted simultaneously by the multiple antennas.

In step 304, the method of the present invention calculates the power allocations for each of the sets of the channel conditions and thus assigns these power allocations to the subscribers associated with the sets of channel conditions. The calculation of the power allocations is based on the evaluation of the channel conditions and the proper amount of power needed to satisfy the sets of channel conditions. For example, a set of channel conditions associated with a particular subscriber may indicate that the subscriber wishes to convey information at a particular information rate for a particular length of time during which a particular phase relationships between the pilot signals exist; the amount of power needed to be allocated to that subscriber is calculated based on these channel conditions for that subscriber at that time. The calculated power amount is thus the associated with that subscriber along with that subscriber's set of channel conditions. Mathematical relationships between one or more channel conditions and power allocation can be determined heuristically or can be based on well established laws of communication theory. At another instant of time the channel conditions for the same subscriber may have changed thus requiring that a new calculation for power allocation be made. A power allocation for each set of channel conditions associated with subscribers requesting access to the communication system or being provided access to the communication system at a particular time period is calculated for all of the antennas at the base station. The specific power amount allocated to each of the N antennas is also calculated. Thus for example, if the power calculated is 2 watts, the method of the present invention also calculates how to properly distribute the 2 watts among the antennas of the base station. For example, for the two antenna case shown in FIG. 1, antenna 108 is allocated 0.8 watts and antenna 110 is allocated 1.2 watts during the particular time period that they are simultaneously transmitting information to the associated subscriber.

In step 306, the method of the present invention applies the determined set of downlink channel conditions and their associated power allocations to a scheduler that is part of the base station equipment. The scheduler is represented by module 106A which is integrated in the base station equipment 106. The scheduler selects a set (i.e., one or more) of subscribers to be given access to downlink channels to satisfy a desired system requirement and schedules that selected set. The selection is done based on the calculated power allocations and set of downlink channel conditions associated with the subscribers. Each selected subscriber has an associated set of channel conditions and a power allocation. Scheduling is determining when to give the selected set of subscribers access to the communication system; in particular, access to the downlink channels of the communication system. The system requirements can be any well known system requirement that system providers want to properly manage in order to operate their communication system in an efficient manner. Examples of system requirements are system capacity, system throughput and overall system delay experienced by users. Returning to the two antenna case shown in FIG. 1, the scheduler can select two of the subscribers that will result in the highest throughput for the communication system at a particular time. In other words the scheduler can apply a maximizing algorithm for system throughput or system capacity or a minimizing algorithm for overall system delay.

The type of scheduler used depends on which system requirement(s) the service provider wishes to manage efficiently. Thus, antennas 108 and 110 will simultaneously transmit information to two selected subscribers for achieving a desired throughput (or system capacity, overall delay) or any other system requirement(s) defined by the service provider.

The communications between the multiple antennas and the multiple subscribers form a Multiple Input Multiple Output (MIMO) system that inherently carries relatively higher capacity than separate subscribers conveying information to separate antennas at the base station. In essence, the method of the present invention uses a scheduler to perform Distributed Multi-Antenna Scheduling (DMAS) for a multiple of subscriber equipment which are able to simultaneously convey information to multiple antennas where such antennas are not necessarily co-located. Co-location refers to antennas situated proximate to each other (e.g., separated by distances of several tens of meters or less). It will be readily obvious that not all of the N (N is an integer equal to 2 or greater) antennas of a DMAS system need be physically located at a base station. Some of the antennas can be located at other places in the communication system.

It should be noted that the antennas shown in FIG. 1 and generally base stations comprising N antennas can be configured and designed with the proper system equipment to perform beamforming operations. In other words, the method of the present invention can be implemented with antennas that simultaneously transmit to one or more subscribers by combining their transmitted signals so as to form a radiation beam pattern covering a geographic area of a cell or a sector of a cell in which the subscribers are located.

We claim:

1. A method for information conveyance between ones of a plurality of subscriber equipments and ones of a multiple of antennas over downlink channels of a wireless communications system, the method comprising the steps of:

scheduling transmission of at least two independent data streams from selected ones of the multiple of antennas to selected ones of the plurality of subscriber equipments via the downlink channels based on sets of channel conditions and calculated power allocations associated with the selected ones of the subscriber equipment to satisfy one of more system requirements, the scheduling further comprising retrieving channel conditions from signaling information received with the multiple antennas from the plurality of subscriber equipments; determining sets of channel conditions associated with the plurality of subscriber equipments; calculating power allocations based on the determined sets of channel conditions; and applying the calculated power allocations and the sets of channel conditions to a scheduler;

causing the at least two independent data streams to be simultaneously transmitted via a common channel from all of the selected ones of the multiple of antennas to the selected ones of the subscriber equipments; and selecting a set of subscribers to be given access to the downlink channels at a particular time based on the applied set of channel conditions and associated power allocation calculations.

2. The method of claim 1 where the selected ones of the plurality of subscribers are subscribers requesting access to the communication system and/or subscribers being provided access to the communication system.

3. The method of claim 1 where the channel conditions are obtained from measurements made by the set of subscriber equipment of pilot signals transmitted by the multiple antennas.

4. The method of claim 1 where the power allocations are calculated based on the sets of channel conditions determined from signaling information received from the set of subscribers.

5. The method of claim 1 where the subscriber equipment comprise cell phones, personal computers and PDAs.

6. The method of claim 1 where the multiple antennas perform beamforming operations so as to transmit simultaneously information to one or more subscribers.

7. A method for information conveyance between ones of a plurality of subscriber equipments and ones of a multiple of antennas over downlink channels of a wireless communications system, the method comprising the steps of:

scheduling transmission of at least two independent data streams from selected ones of the multiple of antennas to selected ones of the plurality of subscriber equipments via the downlink channels, the scheduling further comprising retrieving channel conditions from signaling information received with the multiple antennas from the plurality of subscriber equipments; determining sets of channel conditions associated with the plurality of subscriber equipments; calculating power allocations based on the determined sets of channel conditions; and applying the calculated power allocations and the sets of channel conditions to a scheduler;

causing the at least two independent data streams to be simultaneously transmitted via a common channel from all or the selected ones of the multiple of antennas to the selected ones of the subscriber equipments; and selecting a set of subscribers to be given access to the downlink channels at a particular time based on the applied set of channel conditions and associated power allocation calculations.

* * * * *